United States Patent
Atkins

(10) Patent No.: US 10,191,930 B2
(45) Date of Patent: Jan. 29, 2019

(54) PRIORITY QUEUING FOR UPDATES IN A DATABASE SYSTEM

(71) Applicant: SAP SE, Walldorf (DE)

(72) Inventor: Brendon Atkins, Brisbane (AU)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 15/336,535

(22) Filed: Oct. 27, 2016

(65) Prior Publication Data

US 2018/0046661 A1 Feb. 15, 2018

Related U.S. Application Data

(60) Provisional application No. 62/374,708, filed on Aug. 12, 2016.

(51) Int. Cl.
*G06F 17/30* (2006.01)

(52) U.S. Cl.
CPC .... *G06F 17/30365* (2013.01); *G06F 17/3038* (2013.01); *G06F 17/30324* (2013.01); *G06F 17/30333* (2013.01); *G06F 17/30339* (2013.01); *G06F 17/30368* (2013.01); *G06F 17/30454* (2013.01); *G06F 17/30477* (2013.01); *G06F 17/30498* (2013.01); *G06F 17/30563* (2013.01)

(58) Field of Classification Search
CPC ......... G06F 17/30339; G06F 17/30333; G06F 17/30324; G06F 17/30365; G06F 17/30563; G06F 17/30498; G06F 17/30477; G06F 17/30454; G06F 17/3038; G06F 17/30368
USPC ....................................................... 707/799
See application file for complete search history.

(56) References Cited

U.S. PATENT DOCUMENTS

| 6,058,389 | A | * | 5/2000 | Chandra | G06F 9/546 |
| 7,519,546 | B2 | * | 4/2009 | Murren | G06Q 30/02 |
| | | | | | 705/26.61 |
| 9,208,158 | B2 | * | 12/2015 | Rourke | G06F 17/30038 |
| 9,407,593 | B1 | * | 8/2016 | Milyakov | H04L 69/28 |
| 9,792,349 | B2 | * | 10/2017 | Bose | G06F 17/30595 |
| 2006/0031572 | A1 | * | 2/2006 | Feuerstein | G06F 9/542 |
| | | | | | 709/238 |
| 2006/0122882 | A1 | * | 6/2006 | Brown | G06Q 30/02 |
| | | | | | 705/14.42 |

(Continued)

FOREIGN PATENT DOCUMENTS

WO  WO 2008/148130 A2 * 12/2008 ............. G06F 17/30

*Primary Examiner* — Robert Stevens
(74) *Attorney, Agent, or Firm* — Fountainhead Law Group P.C.

(57) ABSTRACT

In one embodiment, a method receives a list of subscribers at a set interval time. Each subscriber includes one or more updates in which an update to the data stored in a database is required. A queue process in a plurality of queue processes is selected based on a first selection process where different queue processes are used over multiple set interval times. The queue process places subscribers in the list of subscribers in a plurality of queues using a placement process that is based on a characteristic of the subscribers. Also, the queue processes in the plurality of queue processes use different placement processes to place subscribers in the plurality of queues. The method then retrieves subscribers from the plurality of queues based on a second selection process, the retrieved subscribers being provided to the plurality of processors for processing of the respective updates for the subscribers.

20 Claims, 10 Drawing Sheets

(56) References Cited

U.S. PATENT DOCUMENTS

| | | | |
|---|---|---|---|
| 2006/0277319 A1* | 12/2006 | Elien | H04L 51/26 |
| | | | 709/239 |
| 2008/0184270 A1* | 7/2008 | Cole | H04M 3/42136 |
| | | | 719/318 |
| 2010/0251262 A1* | 9/2010 | Rokicki | G06F 9/546 |
| | | | 719/314 |
| 2010/0333111 A1* | 12/2010 | Kothamasu | H04L 51/14 |
| | | | 719/313 |
| 2011/0289496 A1* | 11/2011 | Steer | G06F 8/65 |
| | | | 717/169 |
| 2012/0079004 A1* | 3/2012 | Herman | H04L 67/26 |
| | | | 709/203 |
| 2015/0358257 A1* | 12/2015 | Jasik | G06F 17/30289 |
| | | | 715/752 |

* cited by examiner

| Subscriber #10 | Subscriber #9<br>Subscriber #7<br>Subscriber #5<br>Subscriber #3<br>Subscriber #1 | Subscriber #8<br>Subscriber #6<br>Subscriber #4<br>Subscriber #2 |

FIG. 4A

| Subscriber #1<br>Subscriber #4<br>Subscriber #7<br>Subscriber #10 | Subscriber #2<br>Subscriber #5<br>Subscriber #8 | Subscriber #3<br>Subscriber #6<br>Subscriber #9 |

FIG. 4B

PRIORITY QUEUING FOR UPDATES IN A DATABASE SYSTEM

CROSS REFERENCE TO RELATED APPLICATIONS

The present disclosure claims priority to U.S. Provisional App. No. 62/374,708, entitled "In-Memory Database System for Performing Online Analytics Processing", filed Aug. 12, 2016, the contents of which is incorporated herein by reference in its entirety.

BACKGROUND

In the new era of big data, companies and other organizations have access to vast amounts of structured and unstructured data as well as access to a variety of new data sources. As a result, many data analytics applications have been developed to provide users with insight into their data. One example genre of data analytics applications includes workforce analytics. Workforce analytics applications are used by businesses and other organizations to assist users in understanding their data, making appropriate decisions, and find answers to key questions to gain the insight needed to take actions. Workforce analytics applications are adapted for providing statistical models to worker-related data, allowing companies to optimize their various enterprise processes.

A company's data may change on a continuous basis. For example, employee records may be updated, added, or deleted. When this happens, the data stored in the database needs to be reprocessed. In one example, a service provider may maintain the data for multiple companies and update data on a recurring basis, such as hourly, or daily. For example, each company's updates are processed during the night. In some cases, some company's updates may take longer than other companies' updates. If the companies with longer updates are always processed first, then other companies' updates may not be fairly processed.

BRIEF DESCRIPTION OF THE DRAWINGS

FIG. 4A shows a first queue process that iterates among queues from the highest head count to the lowest head count according to one embodiment.

FIG. 4B shows an example of a queue process that iterates queues from the smallest subscriber to the largest subscriber according to one embodiment.

DETAILED DESCRIPTION

Described herein are techniques for a priority queuing system for updates to a database system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a priority queuing framework that processes updates for subscribers using multiple queue processes. In one example, a queue manager may include multiple queues into which subscribers may be inserted. Then, multiple processors may process the updates for each subscriber based on their position in each queue. For example, subscribers at the beginning of the queue may have their updates processed before subscribers placed later in the queue.

The queue manager may use multiple queue processes that place the subscribers in the queues differently. The queue processes may place the subscribers in queues based on characteristics for the subscribers, such as a number of entities for each subscriber. The queue manager selects different queue processes over multiple updates that are performed. For example, for a first scheduled update, queue manager may use a first queue process to perform the updates for a first list of subscribers, and then on a second scheduled update, queue manager may select a different queue process to place a second list of subscribers that need updates in the queues. This allows for fairness among subscribers over time to ensure that subscribers are not starved or ignored when having their updates processed.

System Overview

Figure 1A:
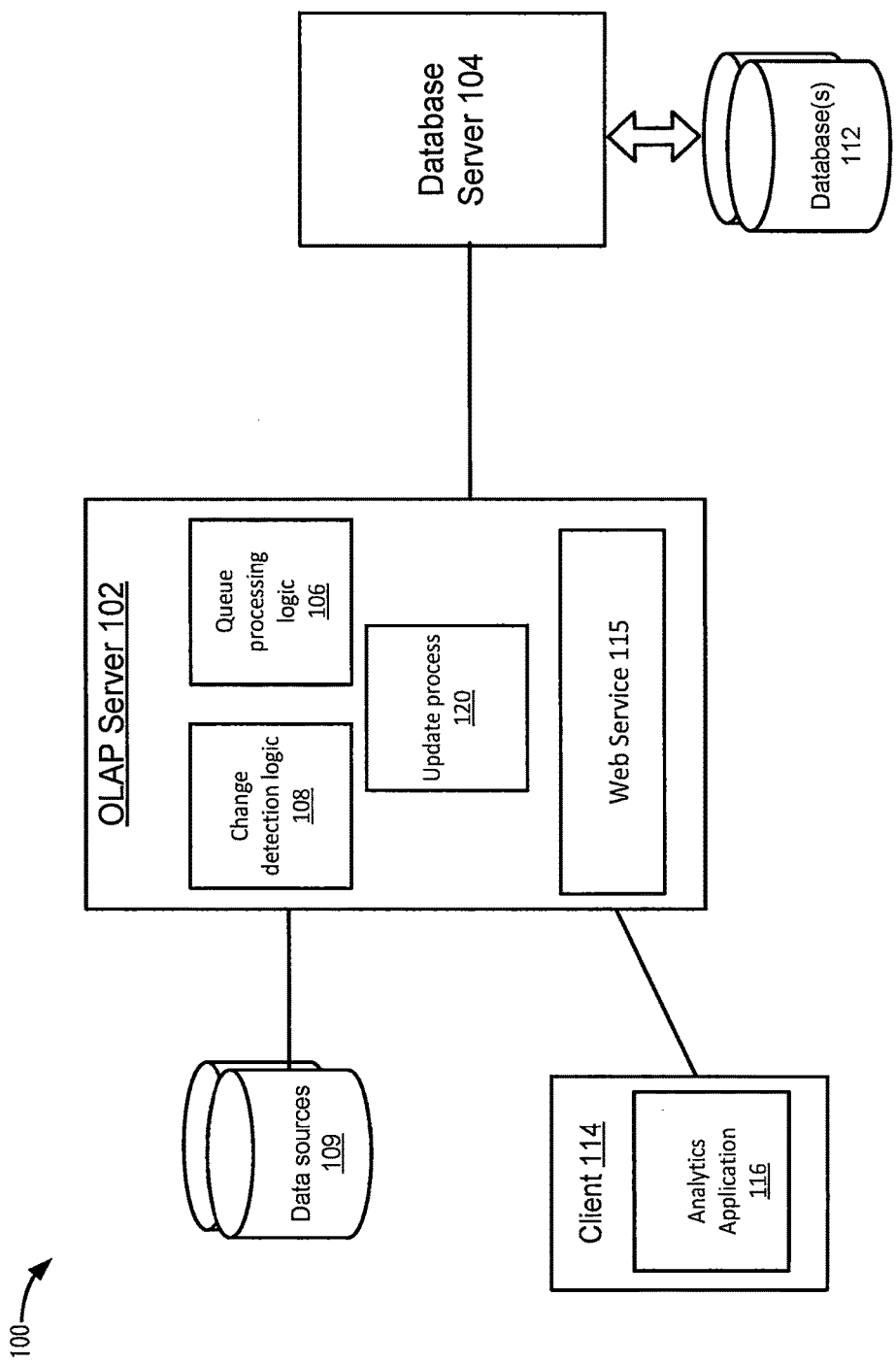
FIG. 1A depicts a simplified system of a system for processing updates using queues according to one embodiment.

FIG. 1A depicts a simplified system 100 for processing updates using queues according to one embodiment. Source data is provided by a number of different data sources 109. The source data may be received at an online analytical processing ("OLAP") server 102 and stored on OLAP server 102. Data sources may include data records for one or more subscribers. Subscribers may include customers, businesses, companies, and other entities for which data is stored in database 112.

In one embodiment, database 112 is an OLAP database that can be accessed by a client 114 using an analytics application 116. Analytics application 116 may include a workforce analytics (WFA) application. As discussed above, workforce analytics applications are used by subscribers in understanding the subscribers' data. For example, workforce analytics applications are adapted for providing statistical models to worker-related data. A web service 115 may be used to respond to queries from analytics application 116 by accessing data in database 112 via database server 104.

Database 112 includes source data for different subscribers that are using analytics application 116. The source data in database 112 may be formatted for the cube data structure. In one example, base measures are built into fact tables and categorized according to dimensions, which may be slices corresponding to time, department, company, division, and location. The data and data object hierarchies can be processed based on collating the dimensions into the cube data array. The cube data structure can aggregate reportable values into aggregates that can be validated and reported to a user. In one example, a cube data structure may enable easy aggregation of multiple values into a single number for analytics reporting via analytics application 116. And each number can be categorized by dimensions to determine the attributes that make up the number.

The cube data structure is queried by analytics application 116 of a client 114. The cube data structure is an interface between OLAP tables in database 112 (e.g., fact, branches, and key mapping tables) and analytics application 116. The cube data structure presents the data in a more readable fashion as measures and dimensions, rather than a collection of tables. The cube data structure also allows queries to be run by analytics application 116.

OLAP server 102 also includes change detection logic 108, which can detect changes in source data that is received from data source 109 for different subscribers. The changes in the source data cause updates that need to be processed for subscribers. This results in updates that need to be processed. In one embodiment, the updates are incrementally processed by an update process 120. Update process 120 may execute at set intervals, such as daily, hourly, etc. In one embodiment, update process 120 may execute for every subscriber that subscribed for this type of incremental update processing. The update process involves checking if data has changed in database 112, and if so, re-processing the changed data to the format required for the cube data structure. The incremental update process may only update records for a subscriber that are required for the update and not all of the subscriber's records. Although an incremental type update process is described, other update processes to subscriber's records may be used, such as continuous or real-time updates.

Figure 1B:
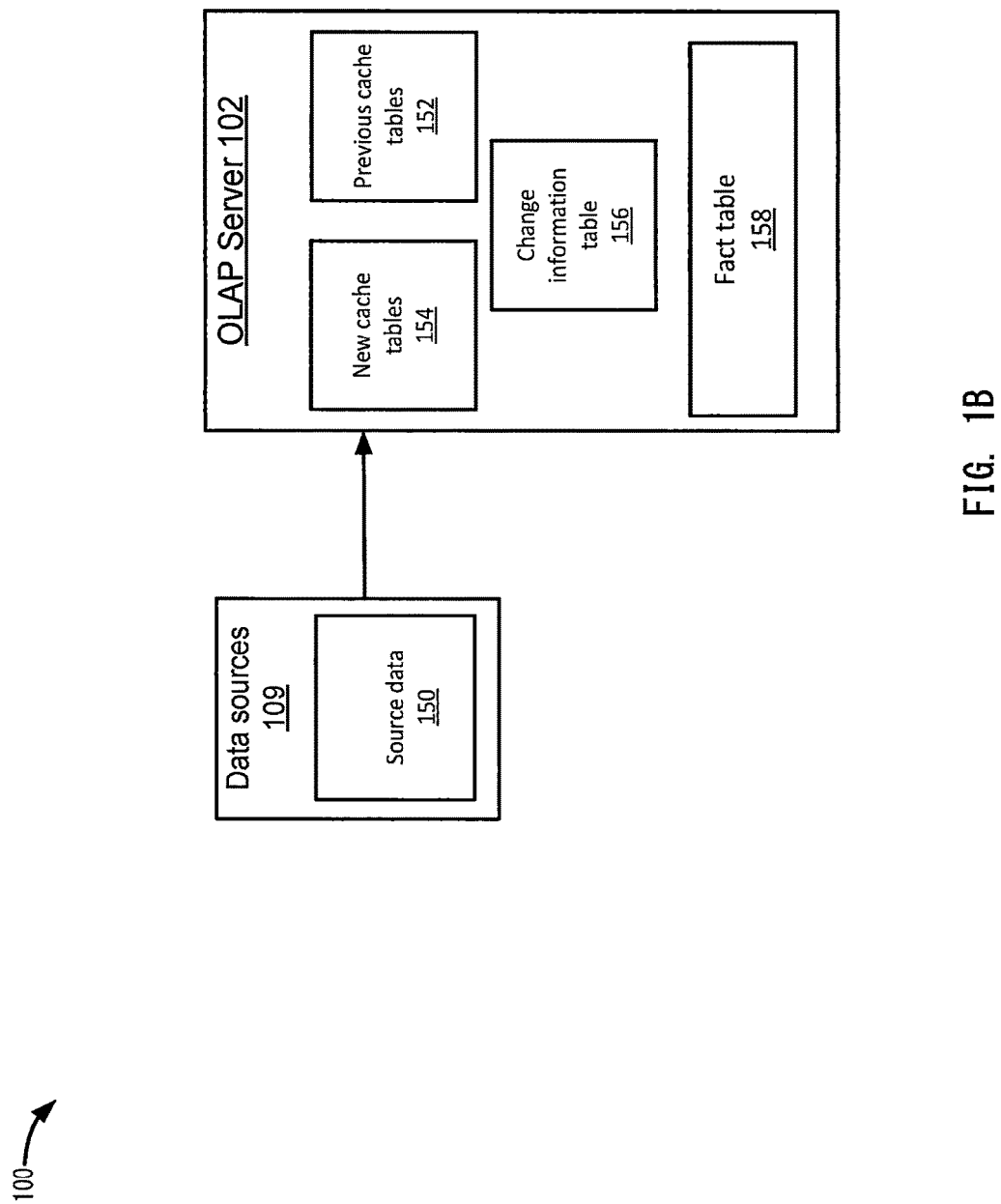
FIG. 1B shows an example of detecting changes in source data according to one embodiment.

FIG. 1B shows an example of detecting changes in source data according to one embodiment. OLAP server 102 loads source data 150 from data sources 109 into database 112. For example, OLAP server 102 uses remote sources of virtual table mechanisms that are configured to copy data from data sources 109 into new cache tables 154 in database 112. In database 112, there is already a cache table 152 that was created at the time of the last update process (e.g., either the initial load or an incremental update). Change detection logic 108 generates a query for each particular data source table in the source data. This query will determine updated, inserted, and deleted records along with any effective date information available for each applicable entity. An entity may be an employee, person, or other entity for a subscriber. For example, the query may compare the information in the new cache table at 154 to the data in the old cache table 152.

Based on the above query, a change information table (CHANGE_INFO_TABLE) 156 includes the changed information from a comparison of previous cache table 152 to new cache table 154. Change detection logic 108 uses this information to determine new, updated, and deleted rows for each entity. The changed information may summarize records that have changed in source data from data sources 109.

In one embodiment, the changes are incrementally processed by update process 120, and the update process may execute at set intervals, such as daily, hourly, etc. For example, update process 120 may execute for every subscriber that subscribed for this type of incremental update processing. In one embodiment, the update process involves checking if data has changed in database 112, and if so, re-processing the changed data to the format required for the cube data structure. The incremental update process may only update records for a subscriber that are required for the update and not all of the subscriber's records. Although an incremental type update process is described, other updates to subscriber's records may be used.

There may be a large number of subscribers that have subscribed to the incremental update process. This may lead to a bottleneck if all subscribers are updated at the same time. Accordingly, queue processing logic 106 provides a queuing process that uses multiple queues to queue subscribers for processing in multiple processors. This allows simultaneous execution of subscribers' updates. Further, queue processing logic 106 may assign subscribers to the queues based on different queue processes. The different queue processes assign subscribers differently to the queues based on one or more characteristics associated with the subscribers. The rotating of queue processes may fairly assign subscribers to the queues over time. That is, different queue processes may assign the subscribers differently over time ensuring fairness. Also, queue processing logic 106 may use a priority value and adjust a priority of a subscriber such that this subscriber may be given higher priority in the update processing.

Update Processing

Change detection logic 108 determines which records have been updated in database 112 for each subscriber. Then, update process 120 may incrementally update the results in database 112, such as updating a fact table in database 112 that is used as a source for the cube data structure. In one embodiment, update process 120 may process as few records as possible.

In one embodiment of the update process, change detection logic 108 may compare a past version of the subscriber data that exists in data source 109 to what is in database 112. Change detection logic 108 then determines which records have changed, such as change detection logic 108 determines records for the entities of the subscriber that have changed as well as the time periods that were affected by the change. For example, a new record for an entity on Jan. 1, 2016 would result in a time period from Jan. 1, 2016 to be updated for this entity. Once change detection logic 108 knows which entities have changed records and the time periods that were affected, then change detection logic 108 can compare that to a fact table in database 112 to determine what type of process can be performed to correctly update the employee records in the fact table while processing as little data as possible. Other tables that may be updated include workforce, branches, and key mapping tables.

A workforce transformation package process processes the subscriber data from separate tables that exist in database 112 to the fact table that is used as the source for cube data structure. The workforce transformation package process takes an unlimited number of records from an unlimited number of tables and turns them into a single timeline for an employee. This timeline means only one record is active per employee at any point in time and contains the attributes that are also active for that employee at that specific point in time. Other components of the workforce transformation package process calculate hires and terminations. The hires and terminations may be processed such that multiple hires cannot be counted in a row without a termination, and vice versa. The workforce transformation package process also calculates internal movements, such as promotions, demotions, and transfers. A movement in (with attributes active after the movement), and a movement out (with attributes active before the movement), are both created from what was a single movement record in database 112. The workforce transformation package process may correct an employee with multiple global assignments such that only one record from the active global assignment will be active for that employee at any point. The workforce transformation package process generates a workforce fact table that is written into tables in database 112.

The branches package process creates dimensions for analytics application 116. The dimensions define both the structure of the codes within a dimension as well as how that dimension links to an employee. The structure can be defined either manually with a user being able to move around the codes in the structure, or sourced directly from the subscriber from the subscriber data. For example, for a location dimension, which is generally sourced from subscriber data, the subscriber might have a country on level 1, state on level 2, and city on level 3 to produce a structure.

A key mapping procedure allows multiple different fact tables to link together. A subscriber may have multiple fact tables because the subscriber may have different types of data that should be reported in a different way. For example, the subscriber might have data related to their workforce which is employee-based, but then data for their recruiting solution that is applicant-based. The subscriber may then wish to join these tables together so the subscriber can report on the level of data that is stored for the employee and the same person when the employee only existed as an applicant. The key mapping table allows an already-optimized join to exist for the fact tables. The key mapping table allows an "inner join" to be performed, which requires a record in one table to have a corresponding record in a second table. So the key mapping table creates a join to a zero-data record in order to ensure that the join can always be completed. The key mapping table also allows for a consistent join between tables. The user specifies which fields can be used to join the tables together, and the key mapping table simplifies this join at runtime into a consistent ID field.

When performing updates, update process 120 may update the fact tables associated with the workforce transformation package, branches package, and key mapping procedure. Then, update process 120 may take the data out of the temporary fact table and store it in a fact table that is referenced by the cube data structure. Then, old versions of any records that are updated may be deleted.

Queue Processing Logic

Figure 2:
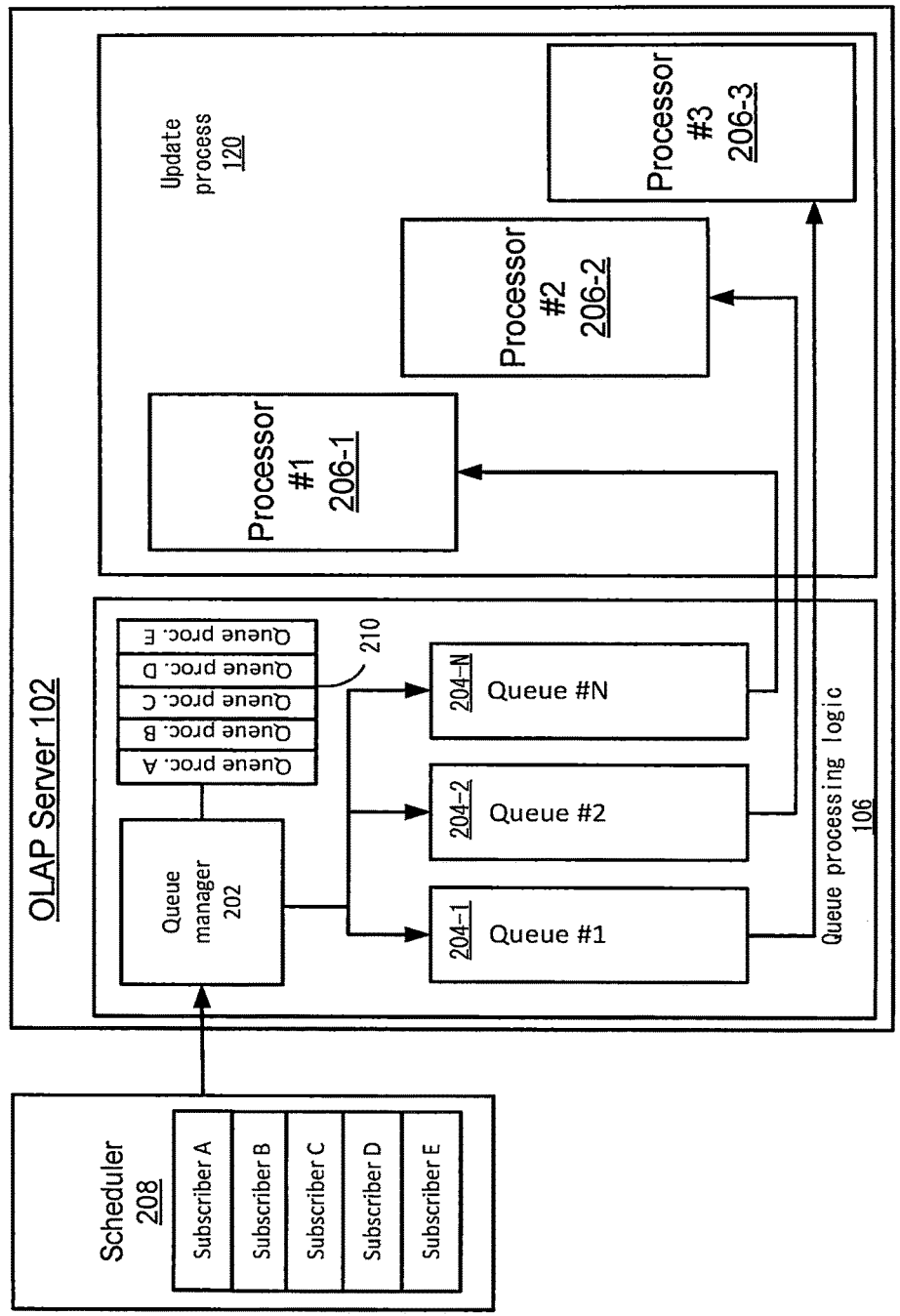
FIG. 2 discloses an example of queue processing logic according to one embodiment.

FIG. 2 discloses an example of queue processing logic 106 according to one embodiment. Queue processing logic 106 includes a queue manager 202 and queues 204-1-204-n. Also, update process 120 includes processors 206-1-206-N (processors #1-#3) that process jobs from the queue to perform the updates discussed above.

A scheduler 208 may determine multiple items referred to as subscribers A-E that have updates that need to be processed. Although subscribers A-E are shown, any number of subscribers may have updates that are queued. In one embodiment, an item may be a subscriber that has a number of updates that need to be processed. In another embodiment, an item may be a record for a subscriber that needs to be updated. In this case, there may be multiple items for the same subscriber that need to be processed. For discussion purposes, subscribers will be inserted into the queue and all updates for that subscriber will be processed when the subscriber is retrieved from the queue. However, other methods of inserting items into the queues may be used.

Scheduler 208 may be located on a separate server than OLAP server 102 or it may be found on OLAP server 102. Scheduler 208 stores a list of subscribers that need to be updated at the particular point in time. Subscribers A-E represent subscribers that need to be scheduled and queued for incremental update processing. Although subscribers A-E are shown, any number of subscribers that require updates may be included.

Queue manager 202 receives the subscribers and uses a queue process in queue storage 210 to place the subscribers in queues #1-#N. As shown, three queues are used, but any number of queues can be used. Additionally, there may be a 1:1 queue:processor relationship. For example, queue #1 is serviced by processor #1, queue #2 is serviced by processor #2, and queue #3 is serviced by processor #3. However, a 1:1 ratio is not necessary. In one example, any number of queues over 2 may be provided with any number of processors.

In one embodiment, processors 206 retrieve subscribers from the queues based on a retrieval process, such as in a first in-first out fashion. In the first in-first out fashion, a first subscriber added to the queue will be the first subscriber processed from that queue, a second subscriber is then processed, and so on. Other processes for processors to retrieve subscribers from the queues may also be appreciated, such as using a priority system where higher priority subscribers are retrieved before lower priority subscribers in a queue regardless of when the subscribers were placed in the queue.

Processors 206 of update process 120 may perform the update for any number of records of a subscriber. For example, a processor initiates a data transform process that takes the subscriber data and transforms it into a format suitable for the cube data structure as discussed above. In one embodiment, each processor 206 may retrieve a single subscriber from a respective queue and process all the records that need updating for that subscriber at one time. When processing for that subscriber is finished, then processor 206 starts the update process with another subscriber from the queue. In another embodiment, processors 206 may be able to process more than one subscriber in parallel, but not all the subscribers in the queue at once.

Queue manager 202 may select queue processes based on a queue selection process. In one example, queue manager 202 selects queue processes in a specified order that rotates. For example, storage 210 may be itself a first in first out queue where queue manager 202 selects the first queue process (e.g., queue process A) in storage 210, and then the second queue process (e.g., queue process B) becomes a first queue process in storage 210 and will be selected next when the incremental update process is run again. The most recently used queue process (e.g., queue process A) is then added to the bottom of the queue process queue. The queue processes continue to rotate in the queue as one queue process is selected per update. Other queue selection processes may be used, such as queue manager 202 may select a queue process based on previous queue placement and/or update processing. For example, if queue manager 202 detects that a subscriber is being placed unfairly in recent placements, then queue manager 202 may attempt to select a queue process that favors that subscriber.

The queue processes dictate how subscribers are added to queues #1-#N. Different queue processes will be described in more detail below and store subscribers in the queues based on different characteristics of the subscribers. Using the different queue processes over a period of time may ensure fair processing among the subscribers. That is, a first queue process may favor a certain type of subscriber, such as a subscriber with a high number of entities, but another queue process may favor a subscriber with a lower number of entities. Thus, by rotating queue processes, the fairness of how subscribers are placed into the queues is provided.

Additionally, if queue manager 202 detects that a subscriber is not being fairly placed in the queues, queue manager 202 may adjust the priority for that subscriber. The priority may be used to determine the order of where the subscribers are placed in the queues. For example, if there are three subscribers in queue #1, the subscriber with the highest priority may be placed at the start of the queue (or retrieved first).

In one embodiment, subscribers are assigned to queues based on a characteristic of the subscribers, such as a measure associated with the subscriber. For example, the measure may be a size of each subscriber's data that may be based on an established head count of the subscriber (e.g., number of entities). The head count may give a rough indication to the row count of the data for the subscriber. This may assume that more entities may mean more possible updates are needed for that subscriber. Instead of head count, other characteristics may be used, such as the number of rows for the subscriber or an actual count of updates that are needed.

The use of the headcount will be described for discussion purposes, but other measures may be used. To spread subscribers across multiple queues, queue manager 202 analyzes the head count of the subscribers to determine the capacity of the queues. Accordingly, the headcount may be used to assign subscribers to the queues in addition to estimating the size of the queues. Queue manager 202 may use the total head count from across all the subscribers that need to be updated and attempt to divide the total head count among the number of queues. The result is a number of people that can belong to a queue and the number of people that are added to the queue may be capped with a threshold. Once the threshold is exceeded, queue manager 202 may not add more subscribers to the queue. The capacity of the queues may be based on the available head count for all subscribers and thus there may always be room in one queue to add any of the subscribers provided they are not in any queue. In one example, when a new subscriber has not been added to a queue before, then the queue size may be readjusted to accommodate the new subscriber. That is, the new subscriber to be added to a queue may cause the total headcount for the queue to exceed the queue's threshold. However, queue manager 202 may adjust the queue size to accommodate that subscriber. The size of other queues may be adjusted downward to account for the increase in the queue.

Queue Processes

As discussed above, different queue processes may be used and are added to storage 210. Rotating the queue processes that are used each time queue manager 202 adds subscribers to the queues ensures that subscribers are not always waiting behind the same other subscribers to be processed. In one embodiment, the process adds multiple subscribers to queues 204 at once, such as at the same interval time. If subscribers are to be added to a queue at a time that is not an update interval time, then the new subscriber may be added to the queue that has the lowest number of subscribers, or has the lowest number of total head count of the subscribers in the queue. When data transforms of a subscriber's data are being used, the timely processing of the updates is important because the subscriber requires accurate records when querying its data.

Figure 3:
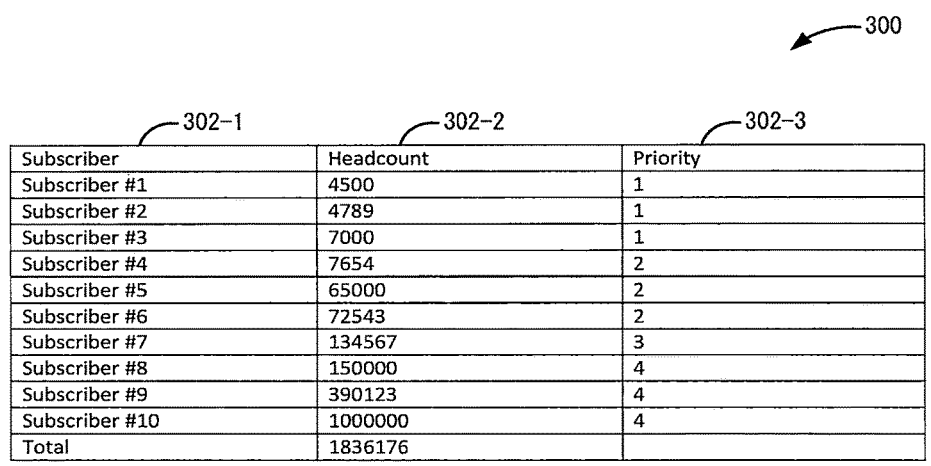
FIG. 3 shows a table of subscribers with their head count and priorities according to one embodiment.

To provide an example of the head count, FIG. 3 shows a table of subscribers with their head count and priorities according to one embodiment. A column 302-1 shows the subscriber; a column 302-2 shows the head count; and a column 302-3 shows the priority. The head count of the subscriber may be the number of entities in the subscriber, or may be the number of rows used by the subscriber. Other characteristics that estimate the size of the subscriber or estimate a time that update processing might take may be used. The priority will be discussed in more detail below, but may be used to favor some subscribers over others in a queue.

The total head count is 1,836,176. Thus, if there are 3 queues, the queue size is 612,058.66 for each queue. Based on the size of the queues, a queue may hold subscriber #10, or subscribers #9, #8 and #7, or subscribers #1, #2, #3, #4, #5, and #6. These combinations are based on the total head count and the queue size, but other combinations may be appreciated that do not exceed the queue size.

Figure 4C:
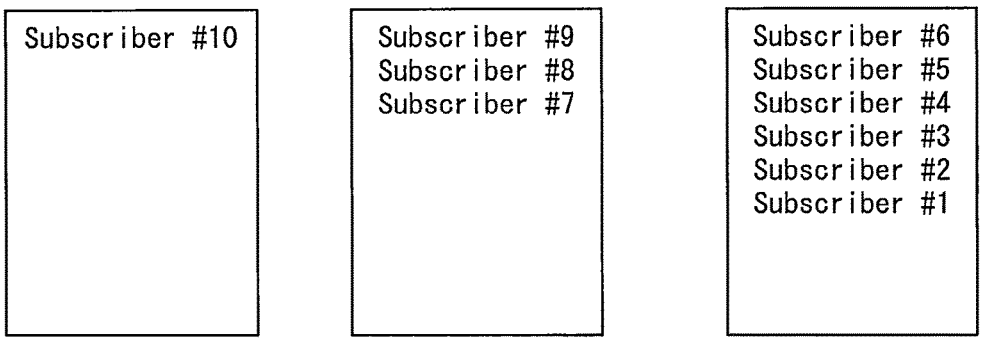
FIG. 4C shows a third queue process that adds subscribers to a queue until it is full from a large subscriber to a small subscriber according to one embodiment.

In one embodiment, six queue processes are used, but other queue processes may be appreciated and used. That is, less queue processes may be used, or additional ones may be added. FIGS. 4A-4E will describe the different queue processes that can be used. FIG. 4A shows a first queue process that iterates among queues from the highest head count to the lowest head count according to one embodiment. Queue process #1 starts with a subscriber with the highest head count and then adds subscribers in order of head count size down to the subscriber with the lowest head count. Queue manager 202 adds each subscriber to a different queue from the previous subscriber that was added. Queue manager 202 rotates through the queues to spread the load. This queue process will place the largest subscribers first followed by smaller subscribers and may be suitable if the subscribers' head counts are close to each other with no outliers.

As shown in FIG. 4A, queue #1 includes subscriber #10, which has a head count of 1,000,000. Queue manager 202 places this subscriber first. Then, in queue #2, subscriber #9 is placed, which has a head count of 390,123. Then, in queue #3, subscriber #8 is placed, which has a head count of 150,000. Since subscriber #10 has a head count that exceeds the queue size of queue #1, queue manager 202 does not place a second subscriber in that queue. However, queue manager 202 places subscriber #7 in queue #2 and then subscriber #6 in queue #3. To continue with the iteration, queue manager 202 places subscriber #5 in queue #2 and subscriber #4 in queue #3, and then subscriber #3 in queue #2 and subscriber #2 in queue #3, and finally subscriber #1 in queue #2.

FIG. 4B shows an example of a queue process that iterates queues from the smallest subscriber to the largest subscriber according to one embodiment. The second queue process is similar to the first queue process except that the smallest subscriber is added first. This spreads the smaller subscribers across the queues first using a theory that smaller subscribers may process faster. The second queue process is suitable if head counts are close to each other with no outliers.

As shown in FIG. 4B, queue manager 202 adds subscriber #1 to queue #1, subscriber #2 to queue #2, and subscriber #3 to queue #3 in a first iteration. Then, in the second iteration, subscribers #4, #5, and #6 are added to queues #1, #2, and #3, respectively. In the third iteration, subscribers #7, #8, and #9 are added to queues #1, #2, and #3, respectively. Subscriber #10 may be added to queue #1 thereafter. Subscriber #10 is added to queue #1 which causes queue #1 to exceed its queue size. However, because subscriber #10 is a new subscriber being added to the queue, the queue size can be exceeded.

FIG. 4C shows a third queue process that adds subscribers to a queue until it is full from a large subscriber to a small subscriber according to one embodiment. The third queue process adds subscribers until a queue is full before moving to the next queue. The third queue process adds larger subscribers in one queue with smaller subscribers in other queues. There may also be fewer subscribers in the first queue with more subscribers in a subsequent queue. If the smaller subscribers are quicker to run, then the assumption is that all the smaller subscribers could be processed in the same time it takes to process one larger subscriber. The third queue process may be suitable if the head counts are close to each other with few outliers.

Referring to FIG. 4C, queue manager 202 has added the largest subscriber, subscriber #10, to queue #1. This exceeds the queue size and queue manager 202 moves to queue #2. Queue manager 202 then adds subscribers #9, #8, and #7 to queue #2. Then, once the queue size of queue #2 is exceeded, queue manager 202 adds subscribers #1-#6 to queue #3. As shown, queue #3 includes more subscribers than queue #1 and queue #2 due to the subscribers in queue #3 having the lower head count.

Figure 4D:
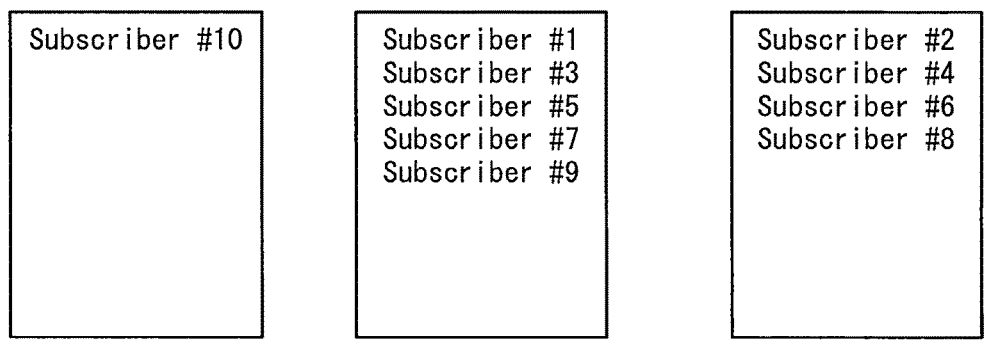
FIG. 4D shows a fourth queue process that iterates queues using a book-end method from large subscriber to first subscriber according to one embodiment.

FIG. 4D shows a fourth queue process that iterates queues using a book-end method from large subscriber to first subscriber according to one embodiment. The book-end method means the largest and smallest subscribers in that the fourth queue process adds the largest subscribers to the queues first while iterating through the queues. Once one queue is full, the fourth queue process adds subscribers from the lowest head count and up. This continues until all subscribers are added.

The fourth queue process adds the largest subscribers at the start of the queues followed by the smallest subscribers that should be quickest to execute with the subscribers becoming slower to execute further into the queue. If the queue size is dependent on the combined head count of all subscribers, then it is likely that the largest subscriber will fill a whole queue in itself. This fourth process may work best for three or more queues because if there are only two queues, then it becomes highly likely that a single subscriber is not larger than one queue meaning it is possible to clog up both queues. The fourth queue process may be useful when there is a large difference in head count between subscribers.

Referring to FIG. 4D, queue manager 202 adds subscriber #10 to queue #1, which fills up queue #1. Following with the book-end method, queue manager 202 then starts adding the smallest subscribers to queue #2 and queue #3 iteratively. This results in subscriber #1 being added to queue #2 and then subscriber #2 being added to queue #3. This process continues iteratively until the subscribers are added to the queues. This results in queue #2 including subscribers #1, #3, #5, #7, and #9. Queue #3 includes subscribers #2, #4, #6, and #8.

Figure 4E:
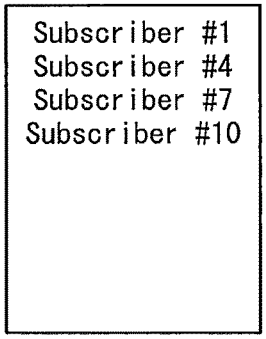
FIG. 4E shows a fifth queue process that iterates queues using the book-end method using the smallest subscriber first according to one embodiment.
Figure 4E:
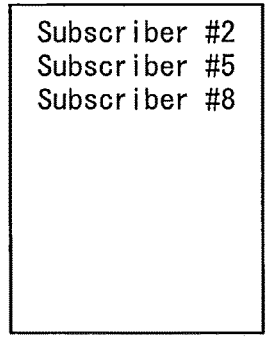
Figure 4E:
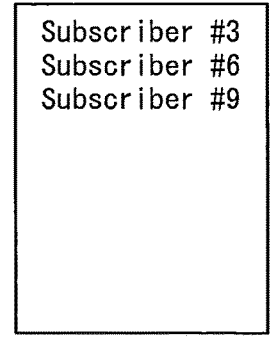

FIG. 4E shows a fifth queue process that iterates queues using the book-end method using the smallest subscriber first according to one embodiment. The fifth queue process is similar to the fourth queue process except that the smallest subscribers are inserted first into the queues before moving on to the largest subscribers. The fifth queue process may be useful if there is a large difference in head count between subscribers at the lower head count end.

Referring to FIG. 4E, queue manager 202 adds subscriber #1 to queue #1, subscriber #2 to queue #2, and subscriber #3 to queue #3. The queues are not filled up and queue manager 202 continues to iterate through the subscribers. The resulting placement results in queue #1 having subscribers #1, #4, #7, and #10; and queue #2 having subscribers #2, #5, and #8; and queue #3 having subscribers #3, #6, and #9. In this case, subscriber #10 may be placed with some of the subscribers with the lowest head counts in queue #1.

A sixth queue process may iterate queues with random insertion. The sixth queue process is designed to ensure that subscribers are distributed between queues evenly. The selection of a subscriber to add to a queue is randomized meaning that in an ideal distribution there should be a mix of larger and smaller subscribers in each queue.

Priority

There may be situations that could arise where a subscriber is provided preferential treatment over other subscribers. This may be because of contracts or service agreements, the prior processing of subscribers, or it could be because of the size of the data across the subscribers. If a situation arises where subscribers should have preference to execute first, then the priorities assigned to the subscribers are used.

In one embodiment, queue manager 202 may readjust the order of the subscribers in the queue. In another embodiment, processors 206 may retrieve subscribers from the queue in an order that is not the first in-first out order, but in an order of priority that overrides the first in-first out order of the subscribers added to the queue. That is, even if a subscriber is added last to the queue, if that subscriber has the highest priority among subscribers in the queue, processor 206 will retrieve the subscriber with the highest priority first. In one embodiment, subscribers with the same priority will be retrieved in the order that the subscribers were added to the queue.

In some embodiments where the update interval is quicker than the time needed to process updates for the subscribers in the queues, such as when scheduler 208 generates updates every half hour, a situation could arise where a subscriber will be re-added to a queue while subscribers in the queue are still waiting to be executed. A newly added subscriber could then jump to the top of the queue if it has a higher priority than other subscribers in the queue. To compensate and prevent a situation where subscribers never leave the queue, queue manager 202 may adjust priorities, such as on every update interval. For example, every item currently in the queue may have its priority adjusted when a new interval occurs, such as increased by 1. This may ensure that subscribers re-added to the queue may not always override subscribers that still need to be processed in the queue.

For example, if a queue includes the following three subscribers of:
Subscriber #3 (priority #1)
Subscriber #6 (priority #2)
Subscriber #5 (priority #2).

Then, subscriber #5 and subscriber #6 have precedence over subscriber #3. In this case, subscriber #5 and subscriber #6 include higher priorities and are thus processed first. Although higher priorities may be processed first, other schemes may be used where lower priorities are processed first and considered "higher" priority.

Once subscriber #5 is processed and removed from the queue, the following subscribers remain in the queue:
Subscriber #3 (priority #1)
Subscriber #6 (priority #2)

Subscriber #6 is then processed and removed from the queue leaving the queue as follows:
Subscriber #3 (priority #1).

On the next update interval, queue manager 202 adds subscriber #5 to the queue. Subscriber #5 has a priority of #2, which is higher than the priority of subscriber #3 that is yet to be processed. However, queue manager 202 may increase the priority of subscriber #3 from a priority #1 to a priority #2. This makes the priority of subscriber #3 to be equal to the priority of subscriber #5. The queue then looks as follows:

Subscriber #3 (priority #2)
Subscriber #5 (priority #2).

By increasing the priority of the subscribers already existing in the queue when a new update occurs, the existing subscribers may have a better chance to be processed first before new subscribers are added. For each subsequent update that subscribers have not been processed yet, then the priority is increased until eventually they will have the highest priority and be processed first.

Method Flows

Figure 5:
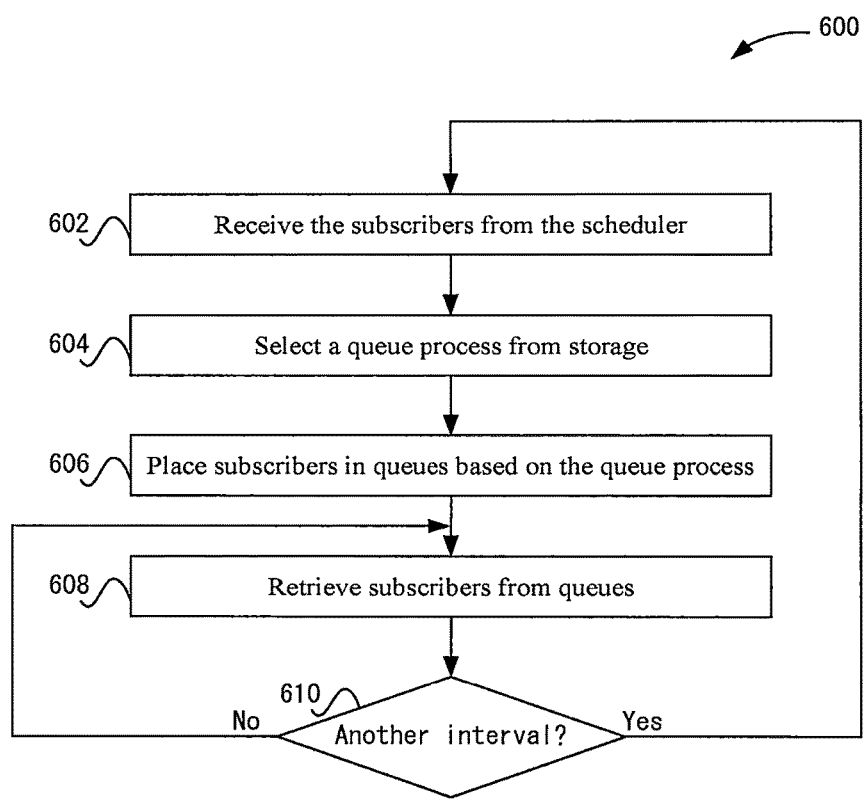
FIG. 5 depicts a simplified flowchart of a method for performing the queuing process according to one embodiment.

FIG. 5 depicts a simplified flowchart 600 of a method for performing the queueing process according to one embodiment. At 602, queue manager 202 receives the subscribers from scheduler 208. This may list the subscribers that are eligible for updates at this update interval.

At 604, queue manager 202 selects a queue process from storage 210. In one embodiment, queue manager 202 may select the next queue process in storage 210. In other embodiments, queue manager 202 may select a queue process based on prior statistics of processing subscribers. For example, queue manager 202 selects a queue process that is determined to be the most fair in placing subscribers based on prior update processing.

At 606, queue manager 202 places subscribers in queues 204 based on the queue process. In one embodiment, queue manager 202 uses information from tables 504, 506, and 510 to place the subscribers in queues 204.

At 608, processors 206 retrieve subscribers from queues 204. In one embodiment, processors 206 use the priority to retrieve the subscribers from queues 204. In other embodiments, processors 206 retrieve subscribers from queues 204 in the order the subscribers were added.

At 610, queue manager 202 determines if another update interval time has been reached. When this occurs, the process reiterates to 602 where a new set of subscribers is received. Also, after reiteration, queue manager 202 can also adjust the priorities for the subscribers that still exist in queues 204. The process then continues to select a new queue process and place the subscribers in queues 204. Also, when a new interval time has not been reached, subscribers continue to be retrieved from queues.

Accordingly, particular embodiments provide queue processing logic that can fairly store subscribers in queues using different queue processes. This may ensure fairness among the subscribers in processing incremental updates for the subscribers. The incremental updates should be processed by updating tables in database 112 to a format that is accessible by cube data structure 122.

System

Figure 6:
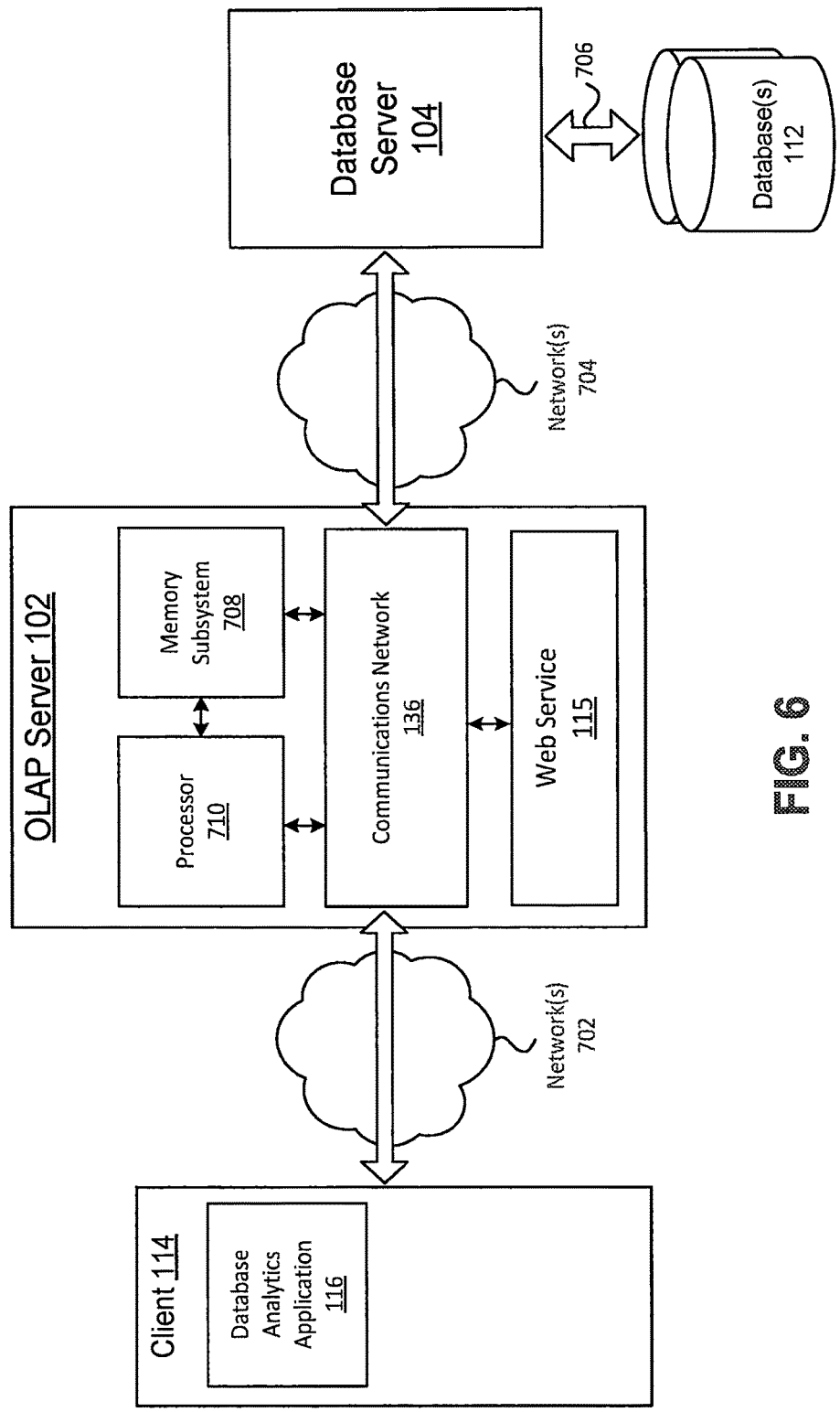
FIG. 6 depicts a conceptual overview block diagram of an example embodiment of a system for performing the priority queueing process in accordance with the techniques described in this disclosure.

FIG. 6 depicts a conceptual overview block diagram of an example embodiment of a system for performing the priority queueing process in accordance with the techniques described in this disclosure. The described database analytics application may be web-based or may reside locally on a user's computer system. The database analytics application may be used to interact with and to configure and view reports of user data. In one embodiment, the system may be configured to provide a user interface for the analytics application via a web service in, for example, in a cloud-based computer network architecture.

As shown in FIG. 6, one or more clients 114, each having at least one user interface, are in communication with OLAP server 102, which may be a web server, via one or more networks 702. OLAP server 102 may provide a web service, such as an OLAP service, to the user interfaces of the clients 114 via, for example, a web service application 115 stored on OLAP server 102. OLAP server 102 includes processor 710 and memory subsystem 708 to perform the queueing process described herein.

In FIG. 6, OLAP server 102 is further in communication with a backend database server 104 over one or more networks 704. The database server 104 is further in communication with one or more databases 112 adapted to store data. In one embodiment, the database server 104 may be in remote communication with the databases 112 via one or more communication links or networks 706. Alternatively, database 112 may be a component of the database server 104 and configured to communicate with the database server 104 via a direct or indirect connection or network. In addition, the database(s) 112 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

In one embodiment, the database server 104 can be configured to perform data accesses operations on data stored in the databases 112 via one or more communications links 706. The database server 104 may be implemented as an individual computer hardware server or as an array of computer hardware servers logically coupled together and working in a functionally coordinated manner. Generally, a database server 104 comprises a system configured to perform data access operations with respect to data stored in one or more repositories of data (e.g., database(s)). Depending on the type of database server 104, data operations may range from simple operations, such as storing and retrieving data, to more complex operations such as calculating statistics based on the data, or arranging, modifying, or formatting data.

The database server 104 may be configured to communicate with a memory subsystem to store and retrieve data for performing operations in accordance with the techniques described in this disclosure. The database server 104 may further include a database manager (not shown). The database manager may be configured as a general-purpose database management system ("DBMS") that communicates with the one or more databases for the purposes of storing and retrieving data to or from the databases. A DBMS may be configured as a computer software application that interacts with the database and other applications or users to capture and analyze data.

For example, a DBMS may be designed to allow for definition, creation, querying, update, and administration of databases. The database manager may comprise an integrated set of computer hardware and software programs that allow client systems to interact with the databases to provide access to data. In addition, the database manager may provide various functions that allow entry, storage, and retrieval of large quantities of information, and provide a mechanism to manage how the information is organized in the databases.

A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs or complex results, e.g., trend analysis from data-mining applications. Many database management systems use the SQL standard query format.

At least certain embodiments are configured to be implemented using in-memory analytics. In-memory analytics is an approach to querying data when it resides in a computer's random access memory (RAM) as opposed to querying data that is stored on separate physical disks. This can result in vastly shortened query times, allowing business intelligence and analytics applications to support faster business decisions. In addition to providing fast query response times, in-memory analytics can reduce or eliminate the need for data indexing and storing pre-aggregated data. This can reduce IT costs and allow faster implementation of business intelligence and analytics applications. In one embodiment, the system described in this disclosure can be implemented on an in-memory, column-oriented, relational database management system. The platform allows data analysts to query large volumes of data in real time, and its in-memory database infrastructure can free analysts from having to continuously load or write-back data to physical disks.

As will be appreciated by persons of skill in the art, network(s) may be implemented as a single wired or wireless network, or multiple separate networks in communication with one another. Network(s) may be implemented as any wired or wireless network(s). For example, the networks described herein can be implemented as a local area network ("LAN"), wide-area network ("WAN"), combination of LANs and WANs, the Internet, or any other type of communication network adapted for communicating electronic messages and information. Further, network(s) may be implemented as a physical array of hardware resources or as a virtual array, or any combination thereof. Network(s) may also be implemented in a cloud-based network configuration. For example, network(s) may be implemented as public or private cloud network, or combination thereof. No specific network or network architecture should be construed as limiting the embodiments and techniques described herein.

Figure 7:
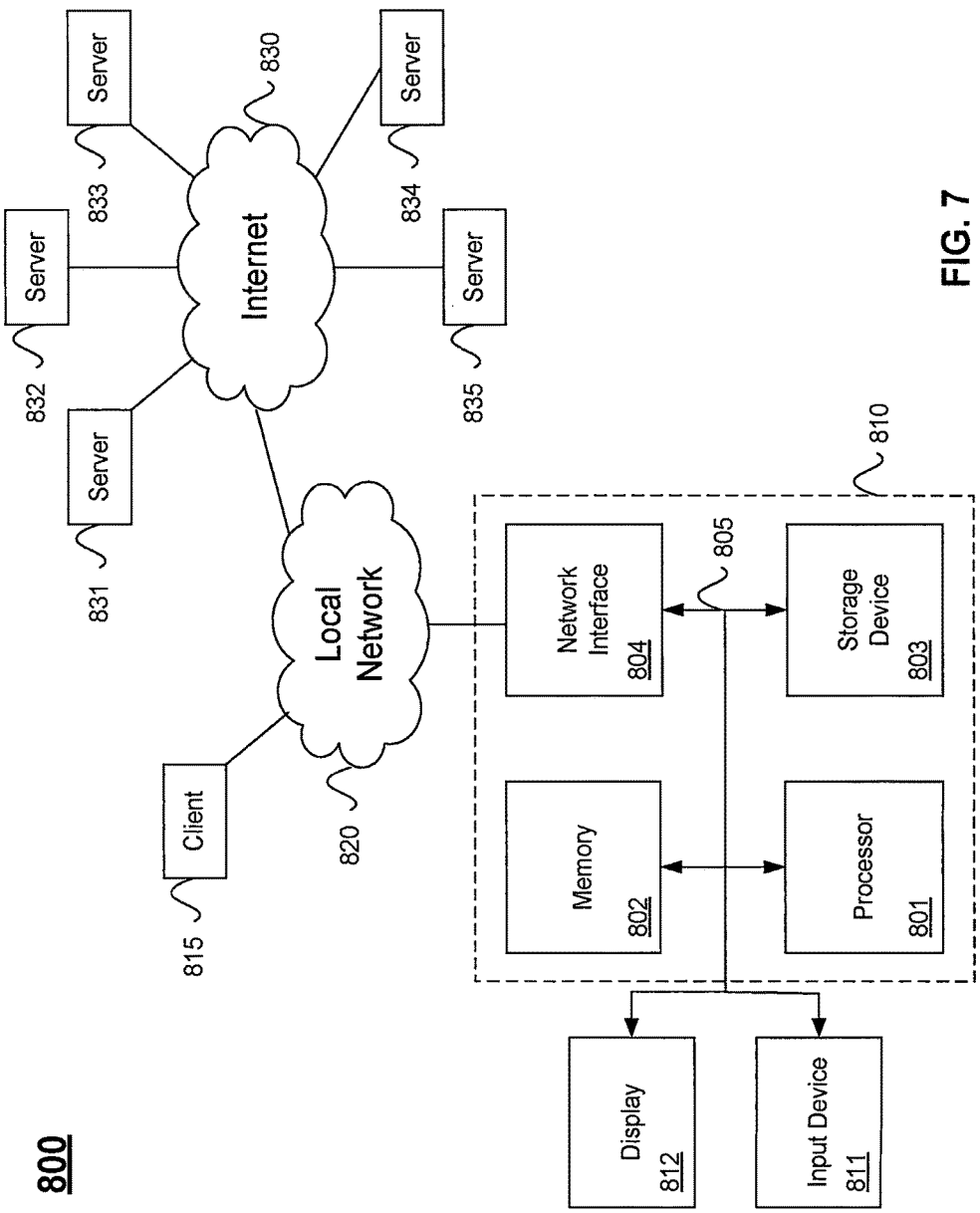
FIG. 7 illustrates hardware of a special purpose computing machine according to one embodiment.

FIG. 7 illustrates hardware of a special purpose computing machine according to one embodiment. The logic may be included on entities in system 100 including OLAP server 102, database server 104, and client 114. An example computer system 810 is illustrated in FIG. 7. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable storage mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a list of subscribers at a set interval time, wherein each subscriber includes one or more updates in which an update to data stored in a database is required;
   selecting, by the computing device, a queue process in a plurality of queue processes based on a first selection process, wherein different queue processes are used over multiple set interval times;
   using, by the computing device, the queue process to place subscribers in the list of subscribers in a plurality of queues using a placement process that is based on a characteristic of the subscribers, wherein the queue processes in the plurality of queue processes use different placement processes to place subscribers in the plurality of queues; and
   retrieving, by the computing device, subscribers from the plurality of queues based on a second selection process, the retrieved subscribers being provided to the plurality of processors for processing of the respective one or more updates for the subscribers.

2. The method of claim 1, wherein the first selection process comprises selecting queue processes in the plurality of queue processes in a specified order.

3. The method of claim 1, wherein the set interval time is associated with an interval in which updates are performed periodically according to the interval.

4. The method of claim 1, wherein retrieving comprises:
   selecting a first subscriber from a queue in the plurality of queues for processing by a first processor in the plurality of processors;
   when processing of the update for the first subscriber is finished, selecting a second subscriber from the queue for processing by the first processor; and
   continuing to select subscribers from the queue for processing by the first processor until no subscribers remain in the queue.

5. The method of claim 1, wherein:
   each processor in the plurality of processors is assigned to a single queue in the plurality of queues, and
   each processor only processes updates for subscribers in the single queue assigned to each respective processor.

6. The method of claim 1, wherein the second selection process comprises selecting a subscriber from a queue of the plurality of queues based on when the subscriber was placed in the queue.

7. The method of claim 6, wherein the second selection process is a first in first out process.

8. The method of claim 1, wherein retrieving comprises selecting a subscriber from a queue of the plurality of queues based on a priority of the subscriber as compared to priorities of other subscribers in the queue.

9. The method of claim 8, further comprising adjusting the priority of at least some of the other subscribers in the queue.

10. The method of claim 9, wherein the priority of at least some of the other subscribers is adjusted to a higher priority when a second set interval time occurs and more subscribers are added to the queue.

11. The method of claim 1, wherein the characteristic estimates a size of a subscriber.

12. The method of claim 1, wherein the characteristic is an entity headcount for the subscriber.

13. The method of claim 12, wherein the plurality of queue processes place the list of subscribers differently based on respective entity headcount for respective subscribers.

14. The method of claim 13, wherein:
   queue sizes for the plurality of queues are based on a total headcount for the list of subscribers, and
   placing the list of subscribers is based on the queue size and an entity headcount for the subscribers in the list of subscribers.

15. The method of claim 14, wherein the plurality of queue processes place the list of subscribers differently in the plurality of queues based on respective entity headcount for respective subscribers.

16. A non-transitory computer-readable storage medium containing instructions, that when executed, control a computer system to be configured for:
   receiving a list of subscribers at a set interval time, wherein each subscriber includes one or more updates in which an update to data stored in a database is required;
   selecting a queue process in a plurality of queue processes based on a first selection process, wherein different queue processes are used over multiple set interval times;
   using the queue process to place subscribers in the list of subscribers in a plurality of queues using a placement process that is based on a characteristic of the subscribers, wherein the queue processes in the plurality of queue processes use different placement processes to place subscribers in the plurality of queues; and
   retrieving subscribers from the plurality of queues based on a second selection process, the retrieved subscribers being provided to the plurality of processors for processing of the respective updates for the subscribers.

17. The non-transitory computer-readable storage medium of claim 16, wherein the characteristic is an entity headcount for the subscriber.

18. The non-transitory computer-readable storage medium of claim 17, wherein:
   queue sizes for the plurality of queues are based on a total headcount for the list of subscribers, and
   placing the list of subscribers is based on the queue size and the entity headcount for the subscribers in the list of subscribers.

19. A method comprising:
   determining, by a computing device, when a time interval is reached for performing an update process for data associated with a plurality of subscribers in a database;
   when the time interval is reached, performing:
      selecting, by the computing device, a queue process in a plurality of queue processes based on a selection process, wherein different queue processes are used at each time interval;
      determining, by the computing device, if subscribers from a prior time interval exist in any of the plurality of queues;
      when subscribers exist in any of the plurality of queues, adjusting a respective priority value of the subscribers that exist in any of the plurality of queues to be higher;
      using, by the computing device, the queue process to place subscribers in a list of subscribers in the plurality of queues using a placement process that is based on a characteristic of the subscribers; and
      retrieving, by the computing device, subscribers from the plurality of queues for processing one or more updates by a plurality of processors based on the respective priority values of the subscribers.

20. The method of claim 19, wherein subscribers with higher priority values are retrieved from a queue in the plurality of queues before subscribers with lower priority values.

\* \* \* \* \*